United States Patent
New et al.

(10) Patent No.: US 7,137,038 B2
(45) Date of Patent: Nov. 14, 2006

(54) SYSTEM AND METHOD FOR AUTONOMOUS DATA SCRUBBING IN A HARD DISK DRIVE

(75) Inventors: Richard M. H. New, San Jose, CA (US); Spencer W. Ng, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 567 days.

(21) Appl. No.: 10/629,675

(22) Filed: Jul. 29, 2003

(65) Prior Publication Data

US 2005/0028048 A1    Feb. 3, 2005

(51) Int. Cl.
*G06F 11/00* (2006.01)
(52) U.S. Cl. ........................................ 714/42; 714/718
(58) Field of Classification Search .................... 714/5, 714/6, 42, 718
See application file for complete search history.

(56) References Cited

U.S. PATENT DOCUMENTS 5,210,860 A * 5/1993 Pfeffer et al. .................. 714/42
5,632,012 A * 5/1997 Belsan et al. .................. 714/6
6,345,349 B1 * 2/2002 Coulson ....................... 711/173
6,715,116 B1 * 3/2004 Lester et al. ................. 714/718
6,848,063 B1 * 1/2005 Rodeheffer et al. ............ 714/6

FOREIGN PATENT DOCUMENTS

EP    WO 02/088922 A2    11/2002

OTHER PUBLICATIONS

Dissertation by Hannu H. Kari, Helsinki University of Technology, Espoo, Finland. Latent Sector Faults and Reliability of Disk Arrays: 1996.

* cited by examiner

*Primary Examiner*—Scott Baderman
*Assistant Examiner*—Joshua Lohn
(74) *Attorney, Agent, or Firm*—John L. Rogitz (57) ABSTRACT

A RAID subsystem with a plurality of hard disk drives has each disk controller autonomously executing data scrubbing on its disks instead of requiring the RAID controller to execute data scrubbing. The data scrubbing may be interrupted upon an I/O request from the RAID controller, or it may continue if a guaranteed scrub rate is not being achieved. Data is stored in large bands of concentric data tracks, and a band may be preferentially selected for scrubbing based on frequency of reading the band, or recency of writing to the band.

23 Claims, 8 Drawing Sheets

Interrupt of Scrub
with Delay,
opportunistic options

Fig. 3 Scrub loop

Fig. 4  Interrupt of Scrub with Delay, opportunistic options

Fig. 5
Guaranteed Rate of Data Scrub

Fig. 6
Scrub Nearest Data Unit

Fig. 7
Scrub Recently Written Data Units

|  | COUNT | FORWARD POINTER | BACKWARD POINTER |
|---|---|---|---|
| 1ST BAND |  |  |  |
| 2ND BAND |  |  |  |
| 3RD BAND |  |  |  |
| ⋮ |  |  |  |
| NTH BAND |  |  |  |

106

Fig. 8
Band Table

Fig. 9
Divide The Disk Into Bands - Table Maintenance

Fig. 10

Divide The Disk Into Bands
- Selection Algorithm

SYSTEM AND METHOD FOR AUTONOMOUS DATA SCRUBBING IN A HARD DISK DRIVE

I. FIELD OF THE INVENTION

The present invention relates generally to hard disk drives, particularly although not exclusively to hard disk drives in redundant arrays of independent disks (RAID) systems.

II. BACKGROUND OF THE INVENTION

Data integrity is of the highest concerns for many data storage subsystems. These subsystems use various RAID techniques to provide data redundancy so that when data is not available from one of the disk drives, it can be recovered from the other drives in the RAID subsystem. Most subsystems provide only single fault tolerance, as the cost of multi-fault tolerance is high. Unfortunately, unrecoverable read error, also known as hard error, occurs in disk drives. This is the failure situation that arises when a sector cannot be read even after all the steps in a drive's error recovery procedure (ERP) have been exhausted. Such steps include invoking all levels of error correction control (ECC) that have been implemented and re-trying using different head offsets. When an unrecoverable read error is encountered while all the other drives in the RAID are still accessible, that sector can be reconstructed from those drives. However, if the hard error is encountered when one of the drives in a RAID has already failed, then both the hard error sector and its corresponding sector in the failed drive are not recoverable. This becomes a data loss situation.

To reduce the probability of encountering a hard error after a drive has failed, some storage subsystems implement some sort of data scrubbing routine in order to flush out such errors before the data is actually needed. In such a scheme, the RAID controller itself periodically issues verify read (i.e., do not read from cache, read from disk media) commands to each drive controller and cycles through every address in each drive. When an unrecoverable error is encountered and reported by one of the drive controllers, the RAID controller will reconstruct that data from the other drives using RAID redundancy. Some subsystems have auto-reassign enabled in the disk drives so that the sector with hard error is automatically re-assigned to a spare location. Others have auto-reassign turned off so that the RAID controller can decide whether to first try rewriting the data back to the original location to see if the problem gets cleared, reassigning only if the problem persists (e.g. scratch on the media). In all cases, the RAID controller logs the statistics of unrecoverable errors. When such errors exceed a predetermined threshold, the drive will be scheduled to be replaced.

The above subsystem controller-managed data scrubbing has two disadvantages. First, the resources of the RAID system controller are required to manage and execute the scrubbing process. Second, data is returned from the drives even though the controller does not really need them. This generates unnecessary traffic on the bus and can potentially degrade system performance. Because of such limitations, the data scrub cycle may take longer than is desirable.

The present invention recognizes that the above problems can be ameliorated by implementing data scrubbing at a disk drive controller level that does not require any action by the RAID controller unless an unrecoverable error is encountered.

SUMMARY OF THE INVENTION

A hard disk drive includes at least one storage disk and a drive controller reading data from and writing data to the disk. The drive controller executes logic that includes executing a scrub cycle entailing reading at least one data unit and determining whether an error exists in the data unit. If so, the error is recorded and/or reported. The error detection logic is executed for subsequent data units. If a user request for a data read or a data write is received, the scrub cycle is interrupted to fulfill the request, and then is resumed.

In a preferred embodiment, the disk drive is in combination with a RAID system, and the user request is received by the drive controller from a RAID controller.

In one non-limiting embodiment, the drive controller logic includes waiting a delay period after fulfilling all user requests in a user request queue prior to resuming the scrub cycle. The delay period may be an adaptive delay period that depends on a frequency and/or a number of user requests received from the RAID controller.

The disk drive may be partitioned into data bands. The drive controller preferably maintains a table indicating, e.g., recent accesses to bands.

A scrub may be preferentially executed on data immediately adjacent on the disk to data that is subject to a user request, concurrently with fulfilling the request. It may also be preferentially executed on data that has been written more recently than other data, and/or on disk areas that are more frequently accessed than other areas.

In another aspect, a hard disk drive includes at least one storage disk and a drive controller reading data from and writing data to the disk. The drive controller executes logic that includes executing a scrub cycle entailing reading at least one data unit and determining whether an error exists in the data unit. If so, the error is recorded and/or reported. The error detection logic is executed for subsequent data units. If a user request for a data read or write is received, and if a current scrub rate exceeds a threshold rate, the scrub cycle is interrupted to fulfill the request and then is resumed. Otherwise, an existing scrub read of the scrub cycle is not aborted.

In still another aspect, a hard disk drive includes at least one storage disk and a drive controller reading data from and writing data to the disk. The drive controller executes logic that includes executing a scrub cycle entailing reading at least one data unit and determining whether an error exists in the data unit. If so, the error is recorded and/or reported. The error detection logic is executed for subsequent data units. The scrub cycle can be executed on first data that has been written more recently than second data, and then can be executed on the second data. Or, the scrub cycle can be preferentially executed on disk areas that are frequently accessed.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
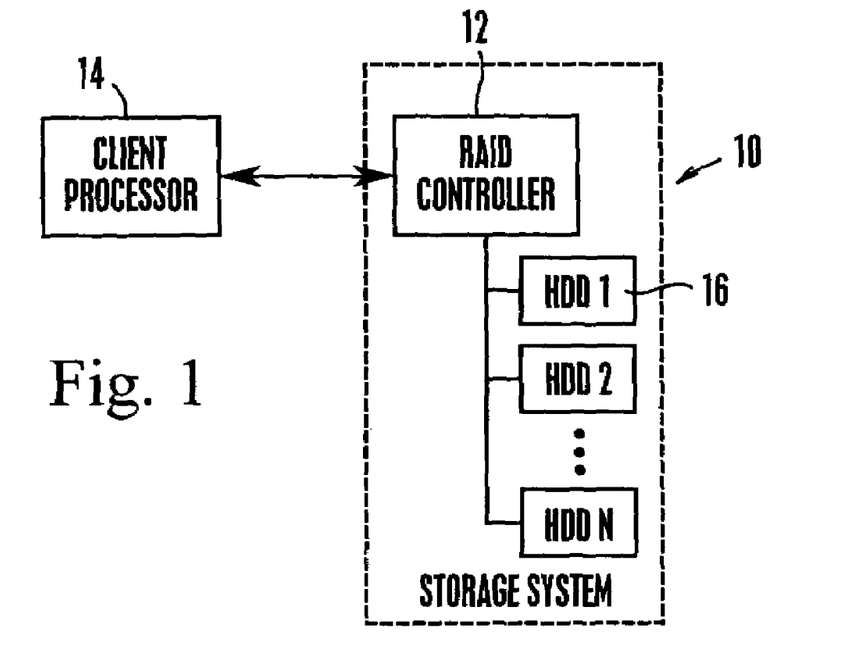
FIG. 1 is a block diagram of a RAID system in cooperation with a client processor.
Figure 2:
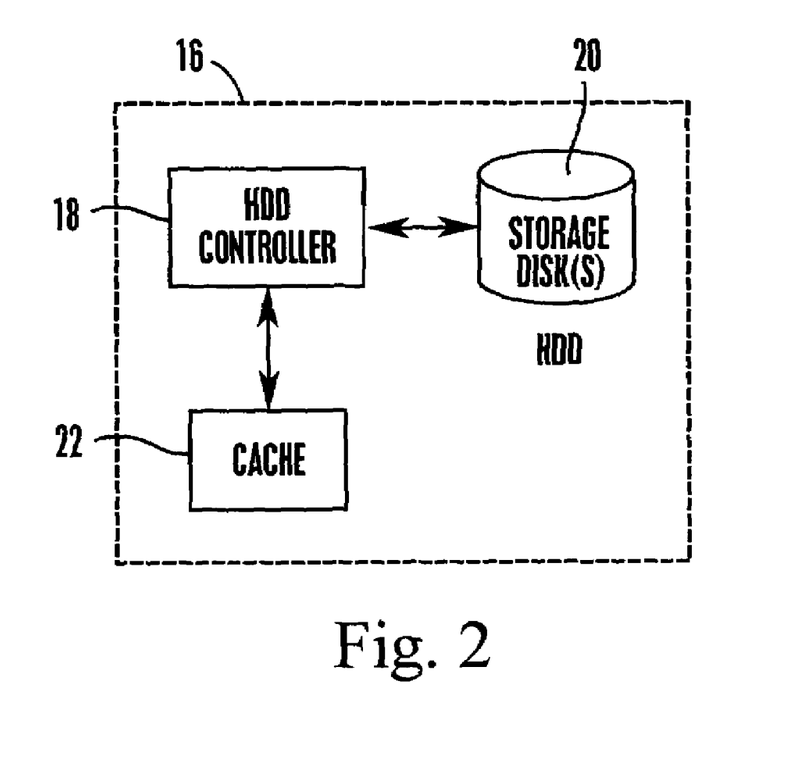
FIG. 2 is a block diagram of one of the hard disk drives (HDD) of the system shown in FIG. 1.

Referring initially to FIG. 1, a RAID system is shown, generally designated 10, that includes a RAID controller 12 which communicates with one or more client processors 14 to store and retrieve data on plural hard disk drives (HDD) 16. FIG. 2 shows that a hard disk drive 16 of the present invention includes a drive controller 18 that reads and writes data onto one or more data storage disks 20 in response to requests from the RAID controller 12. Each HDD 16 may also include a solid state data cache 22 as shown in accordance with HDD principles known in the art. In accordance with present principles, each HDD controller 18 of the RAID system 10 autonomously executes the below-described scrubbing logic, i.e., each drive controller 18 undertakes data scrubbing on its disks on its own, autonomously from the RAID controller 12.

Figure 3:
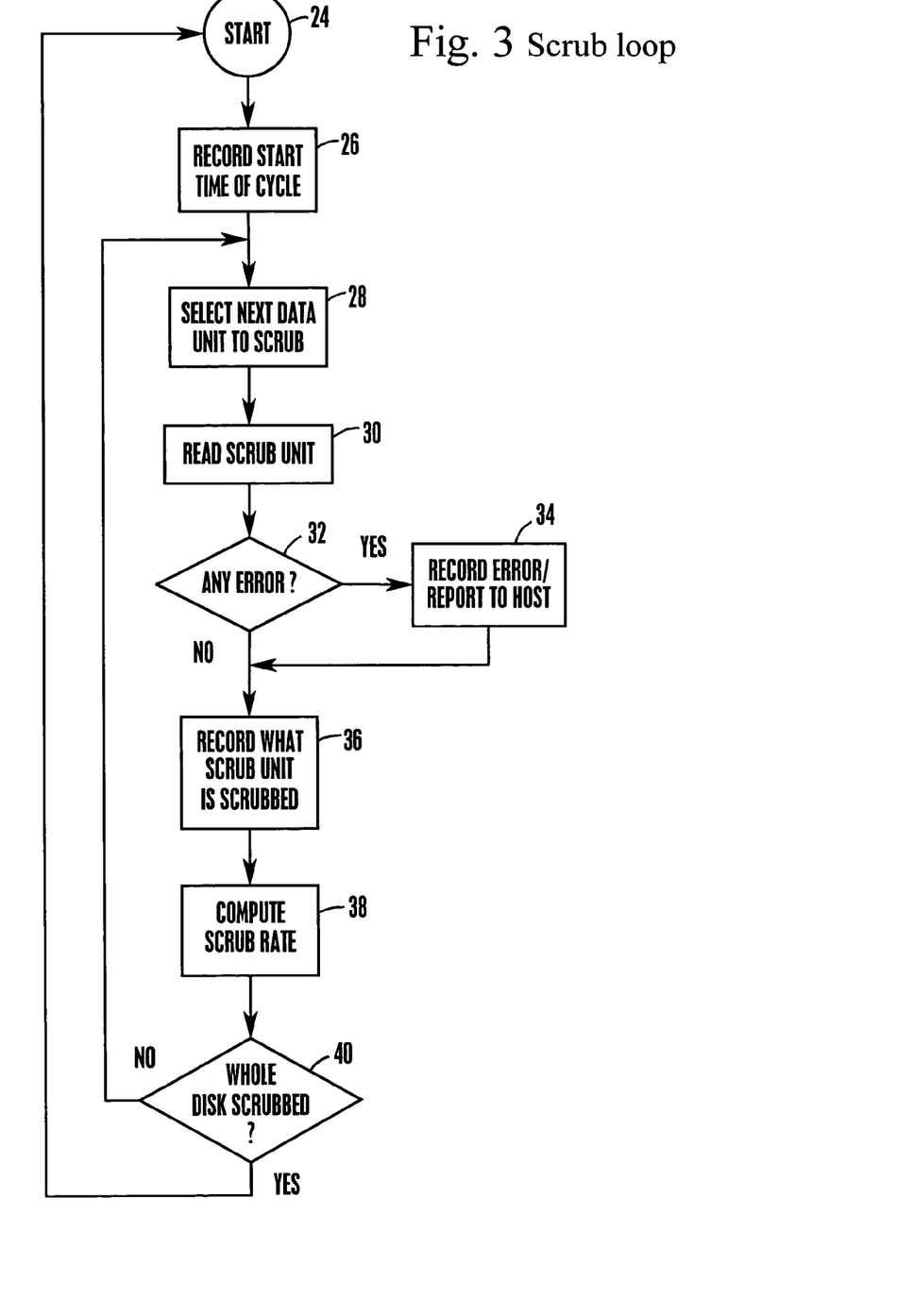
FIG. 3 is a flow chart of the data scrub process, showing optional logic to support guaranteed rate of scrub.

FIG. 3 shows the logic of the present scrub loop, which preferably is repeated indefinitely by the drive controller 18. Commencing at start state 24, when a guaranteed rate of scrubbing is implemented as more fully described below in reference to FIG. 5, the logic moves to block 26 to record the start time of the scrub cycle.

Figure 6:
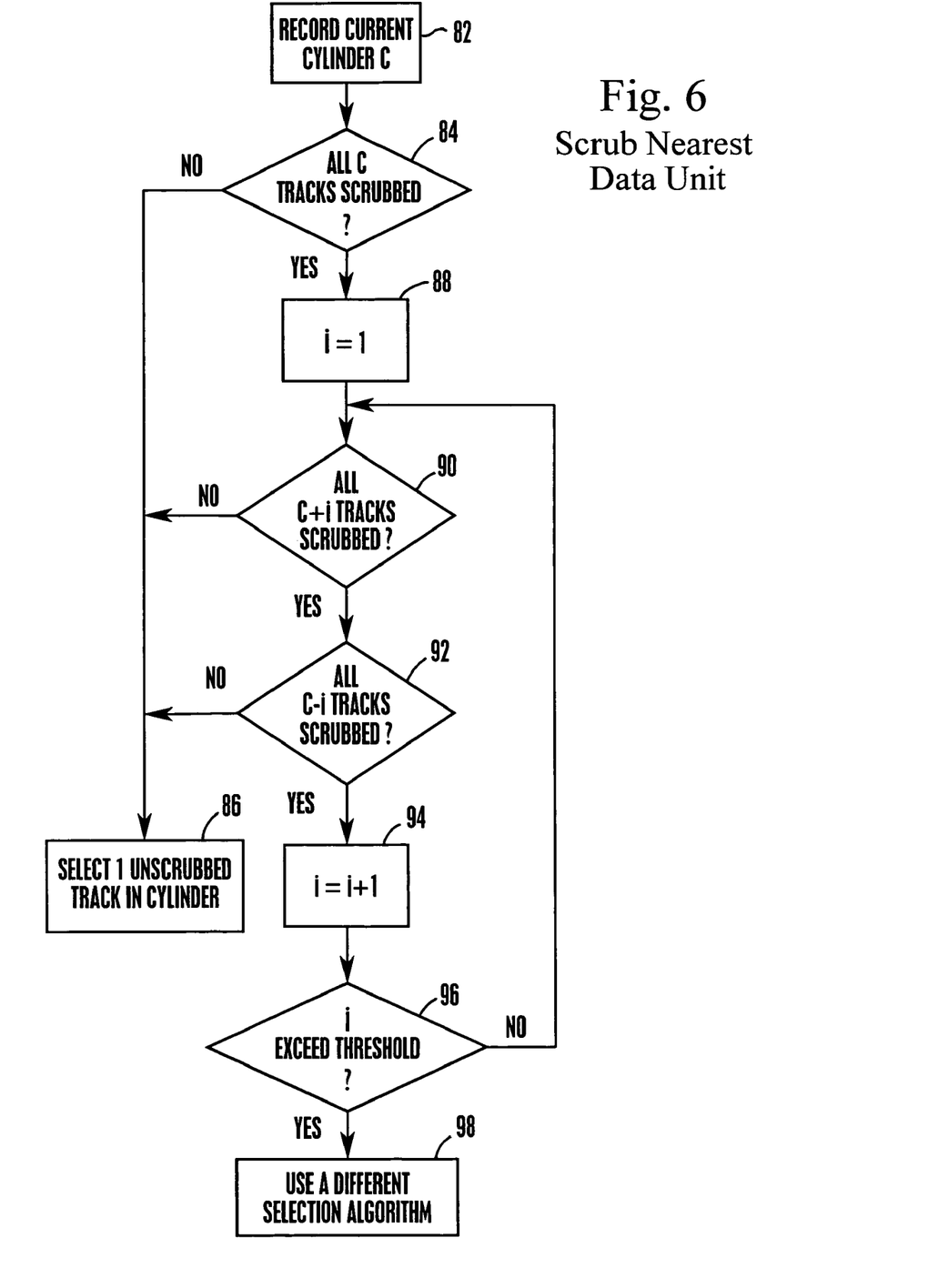
FIG. 6 is a flow chart showing the preferred process for selecting the next data unit to scrub during the scrub process of FIG. 3.

From block 26 or from start state 24 when no guaranteed rate of scrubbing is implemented, the logic proceeds to block 28 to select a next data unit to scrub, as discussed in reference to FIG. 6 below or using other below-discussed criteria. In non-limiting embodiments data is stored on the disk 20 in "bands", with a band being established by a logical partitioning of the available data space on the disk. For example, a 100 GB drive may be partitioned into 100 bands of 1 GB each, or 1000 bands of 100 MB each, etc. A single data unit may be for a relatively large number of sectors, e.g., five hundred twelve, or indeed for an entire track. For the case of full track read, a zero-latency read technique (i.e. start reading as soon as the head is on track) can be easily applied when doing a scrub read so that rotational latency overhead is eliminated. As set forth further below, a bit map corresponding to the scrub data units can be used to keep track of which units have already been scrubbed, but any other method can also be used. At the start of each scrub cycle the bit map is reset.

Once the data unit to be scrubbed is identified, the data unit is read at block 30. At decision diamond 32 the drive controller 18 determines whether any uncorrectable errors exist in the data unit. If an error is detected, the location (address) of the error is recorded at block 34. The RAID controller 12 may optionally be notified of the error immediately at this step. Then, at block 36 the drive controller 18 updates its list (or bit map) of which data units have been scrubbed. When guaranteed rates of scrubbing are used, the logic also flows to block 38, wherein the scrub rate is determined by, e.g., dividing the amount of data that has been scrubbed as recorded at block 36 by the total time that has elapsed since the start of the scrub cycle as recorded at block 26. Lastly, at decision diamond 40 it is determined whether the entire disk has been scrubbed, and if not, the logic loops back to block 28. Otherwise, the logic recommences another scrub cycle at start state 24.

Figure 4:
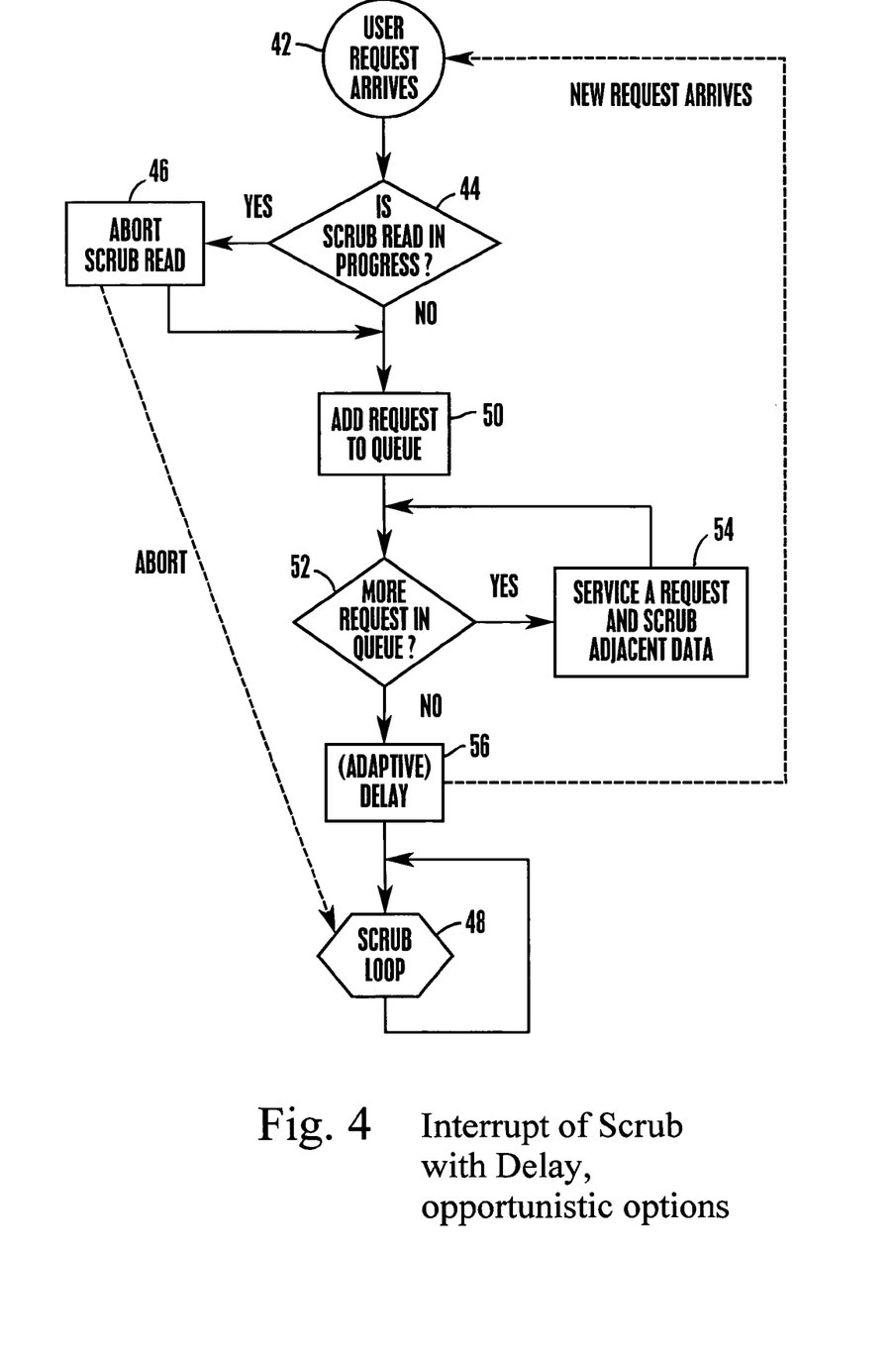
FIG. 4 is a flow chart of the process for interrupting the scrub process shown in FIG. 3, showing optional logic for delaying by a fixed or adaptive period the resumption of the scrub and showing optional logic for opportunistic data scrubbing.

FIG. 4 shows the logic that the drive controller 18 can implement when no guaranteed rate of scrubbing is invoked. Assuming that the scrub loop shown in FIG. 3 is being perpetually executed, at state 42 a user request (from, e.g., the RAID controller 12) for a read or write to the disk 20 is received. At decision diamond 44 the drive controller 18 determines whether a scrub read is in progress, and if so the scrub read is aborted or otherwise suspended at block 46. The dashed line in FIG. 4 indicates that the scrub loop) subroutine of FIG. 3, denoted by the polygon 48, is notified or otherwise suspended.

From block 46 or from decision diamond 44 if no scrub read was in progress, the logic proceeds to block 50 to add the I/O request to a queue of requests. Moving to decision diamond 52, it is determined whether any unfulfilled requests are in the queue. If there are, a request is serviced at block 54. Any scheduling algorithm can be used in selecting which request in the queue is to be serviced next, including first-come-first-served, shortest-time-first, etc.

In one augmentation, the scrub loop may be opportunistically executed on data that is immediately adjacent on the disk to data that is subject to the user request while fulfilling the request, as part of the logic of block 54. This can be accomplished by expanding the request to include one or more adjacent data scrub units. For example, a read request might be to read 128 sectors, say from address 5020 to address 5147. When opportunistic scrubbing is invoked, the drive controller 18 might read the entire scrub unit (from, say, addresses 5000 to 5999) that contains the requested sectors, scrubbing the entire unit while doing so.

If desired, once all user I/O requests have been fulfilled the logic can move to block 56 to wait a delay period before resuming the scrub loop of FIG. 3. The delay period can be fixed or it can be adaptive, and depend on, e.g., the frequency of user requests being received (with more requests, e.g., leading to a longer delay period), and/or on the number of user requests received from the RAID controller, with more requests, e.g., resulting in a longer delay period. The delay period increases the probability that no new request is likely to arrive in the near future, i.e., the HDD is entering into an idle period of time. If a new request arrives during the delay period, the logic returns to start state 42; otherwise, it reenters the scrub loop at state 48.

In determining the adaptive delay period, the drive controller 18 can calculate the amount of elapsed time since the arrival of the last user request as recorded at state 42. In this example the delay to be executed is computed using this elapsed time. One example of such a calculation is delay=k/elapsed time, wherein k is a constant. Thus, if the elapsed time is short, the delay is long, as there is a high likelihood that another request may arrive soon; and if the elapsed time is long, the delay is short as there has not been any activity to the HDD for an extended period of time and so doing scrubbing more frequently is not likely to affect performance. Other adaptive methods or formulae can be used, as intimated above.

Figure 5:
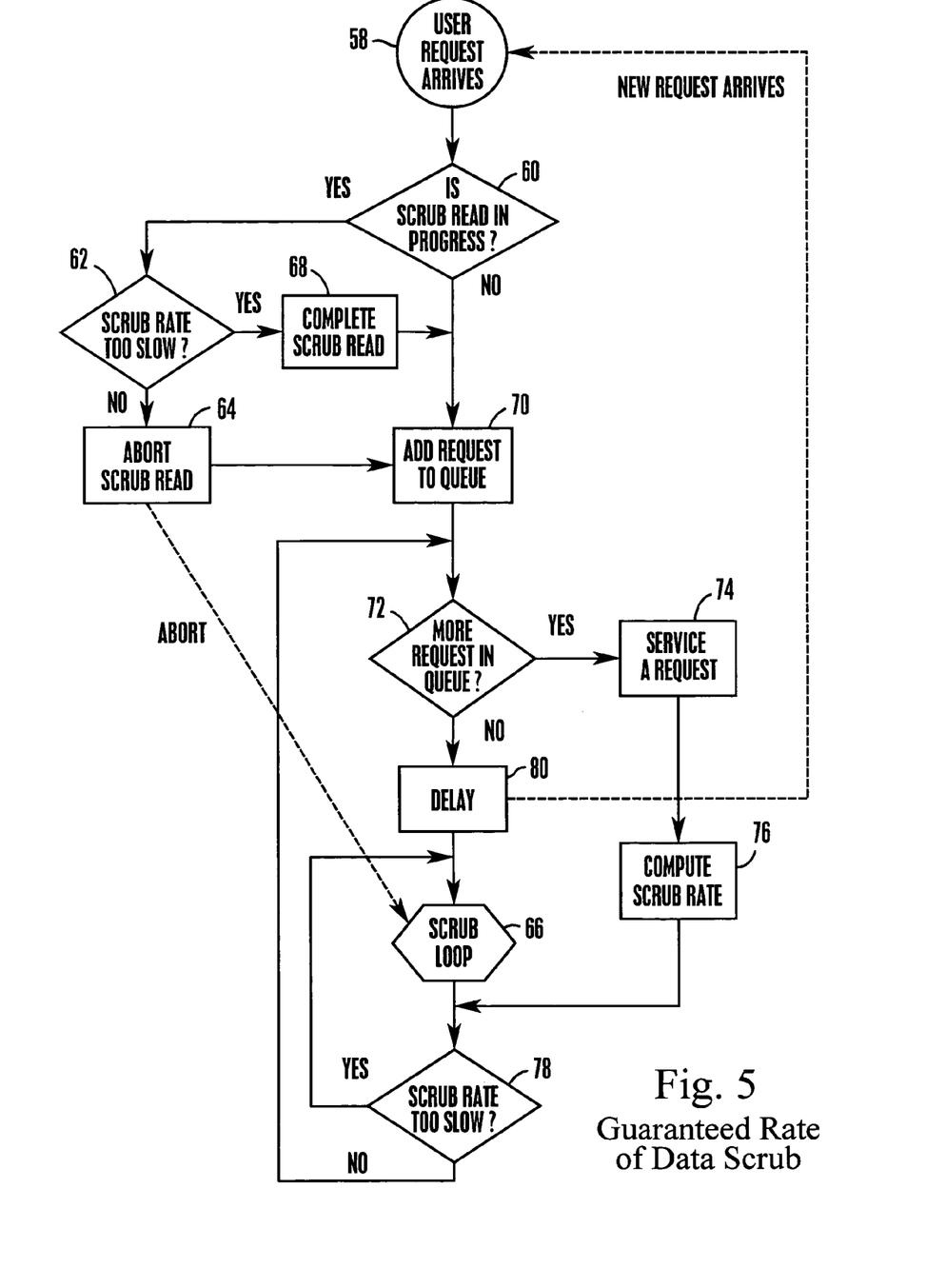
FIG. 5 is a flow chart showing the process for establishing a guaranteed rate of scrub, using the scrub process of FIG. 3.

FIG. 5 shows the logic that can be followed when it is desired that scrubbing occur at least at some threshold rate that can be defined by the user. Assuming that the scrub loop shown in FIG. 3 is being perpetually executed, at state 58 a user request (from, e.g., the RAID controller 12) for a read or write to the disk 20 is received. At decision diamond 60 it is determined whether a scrub read is in progress, and if so the logic proceeds to decision diamond 62, to determine whether the current scrub rate (as determined at block 38 of in FIG. 3) is below the threshold rate. If it is not, the logic moves to block 64, where the scrub read is aborted or otherwise suspended. The dashed line indicates that the scrub loop subroutine of FIG. 3, denoted by the polygon 66, is notified or otherwise suspended.

In contrast, when it is determined at decision diamond 62 that the scrub rate is insufficient (i.e., is too slow), the logic moves to block 68 to complete the current scrub read, prior to servicing any user request. From decision diamond 60 when no scrub read is in progress, or from blocks 64 and 68 when a read is in progress and depending on the scrub rate, the logic moves to block 70 to add the user request to a queue of requests.

Moving to decision diamond 72, it is determined whether any unfulfilled requests are in the queue. If there are, a request is serviced at block 74. If desired, as was the case with the logic of FIG. 4, the scrub loop may be opportunistically executed on data that is immediately adjacent on the disk to data that is subject to the user request, concurrently with fulfilling the request, as part of the logic of block 74.

From block 74 the logic of the drive controller 18 moves to block 76 to compute the new scrub rate, and then proceeds to decision diamond 78 to determine whether the scrub rate is too slow. If it is, the logic reenters the scrub loop of FIG. 3, as indicated at polygon 66, and remains in the loop between states 66 and 78 until the scrub rate equals the user-defined threshold. When that happens, the logic moves back to decision diamond 72. As shown in FIG. 5, when all user requests in the queue have been fulfilled as determined at decision diamond 72, the logic optionally may move to block 80 to invoke the above-described delay period, prior to reentering the scrub loop at state 66.

As disclosed above, the presently preferred embodiment uses a physical track or portion thereof as a data scrub unit. When scheduling which data units to scrub, instead of going sequentially from beginning to end, the next scrub read may be scheduled to take place in the closest vicinity to where the head of the disk drive 16 is currently. To that end, in one non-limiting embodiment the logic executed at block 28 of FIG. 3 may be implemented by the logic shown in FIG. 6.

Commencing at block 82, the physical cylinder number "C" of where the head is currently is recorded. At decision diamond 84, the drive controller 18 determines whether all the tracks in cylinder C have already been scrubbed. If at least one track has not yet been scrubbed, the logic moves to block 86 to select an unscrubbed track from that cylinder, and then the logic moves to block 30 of FIG. 3.

When it is determined at decision 84 that all tracks in cylinder "C" have been scrubbed, the logic moves to block 88 where an index variable "i" is initialized to 1. Proceeding to decision diamond 90, it is determined whether all the tracks in cylinder C+i have already been scrubbed. If not, the logic moves to block 86. Otherwise, the logic proceeds to decision diamond 92, wherein it is determined whether all the tracks in cylinder. C−i have already been scrubbed. If at least one track has not yet been scrubbed in cylinder C−i, the logic moves to block 86, but when the test at decision diamond 92 is positive the logic moves to block 94 to increment the index variable "i" by unity.

Proceeding to decision diamond 96, it is determined whether the index variable "i" exceeds a threshold. If not, the logic returns to decision diamond 90. If the threshold is exceeded, however, block 98 is entered where a different algorithm can be used for selecting the next scrub unit. This limits the searching to a reasonable amount of time and also switches to a different selection method after "i" has become too large to have any performance advantage.

As non-limiting examples of different selection methods that can be used to select a data unit for scrubbing, data that has been written more recently than other data may be selected for scrubbing prior to scrubbing the other data. Or, areas of the disk that have been more frequently accessed may be scrubbed prior to scrubbing other, less frequently used areas.

Figure 7:
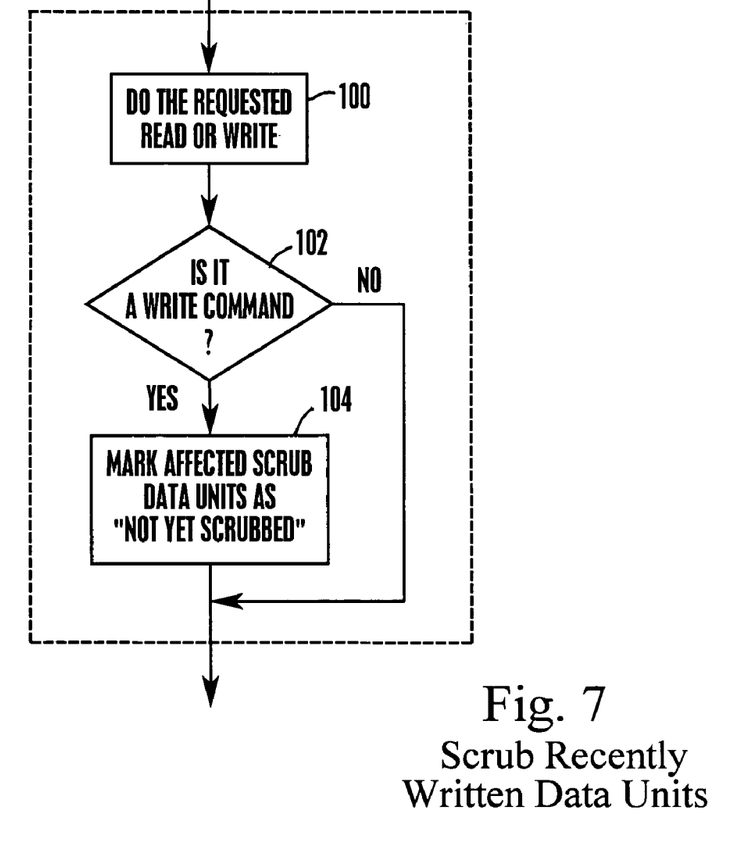
FIG. 7 is a flow chart showing the preferred process for performing the user-requested read or write during the scrub interrupt logic of FIG. 4.

More specifically, the present invention recognizes that some unrecoverable errors may be caused by bad writes. To discover such errors more quickly, the drive controller 18 can schedule to scrub tracks and adjacent tracks that have been recently written, as illustrated in FIG. 7. In accordance with disclosure above in connection with blocks 54 and 74 of FIGS. 4 and 5, respectively, servicing a request may include performing the requested read or write command at block 100, and then, at decision diamond 102, determining whether the just-completed command is a write command. If it is a write command, at block 104 the drive controller 18 marks the scrub units affected by the write command as being not yet scrubbed, regardless whether they have been scrubbed in this cycle or not. In the preferred embodiment where a bit map is used to keep track of scrubbed units, the corresponding bits of those units are reset. This way, those units will not have to wait for the next scrub cycle before they get scheduled to be scrubbed, but may be immediately scrubbed. Furthermore, these data units will likely be scheduled quickly when the scheduling policy of FIG. 6 is used. In the preferred embodiment where the scrub unit is a physical track, the affected scrub units would be the track containing the just-written data and its adjacent tracks on the same surface.

As mention previously, the disk 20 may be divided logically into data bands that are not necessarily equal in size. Associated with the bands is a table 106 shown in FIG. 8, with each entry corresponding to one band. Each entry contains a count field as indicated by the first column. The entries preferably establish a double linked list in order of decreasing count, so each entry also contains a forward pointer and a backward pointer for this link-list as indicated by the second and third columns. In addition to the band table, the HDD maintains a pointer which points to the top of this link-list (the entry with the highest count).

Figure 9:
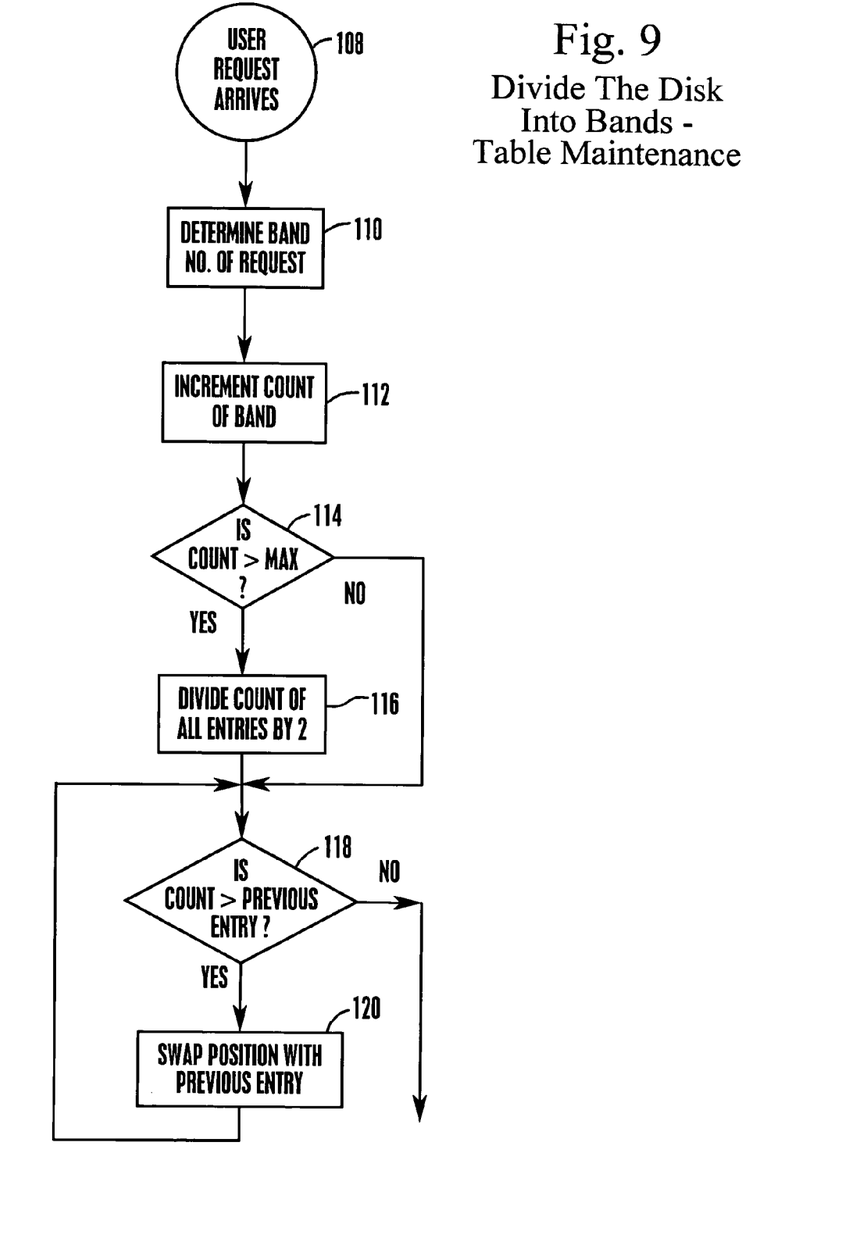
FIG. 9 is a flow chart showing the preferred process for maintaining the table of FIG. 8.

In this non-limiting implementation and now referring to FIG. 9, every time a new user I/O request is received by the HDD 16 at state 108 of FIG. 9, the drive controller 18 determines which band the request is in at block 110. At block 112, it increments the count for that band. Moving to decision diamond 114, it is determined whether the resulting count exceeds the maximum that the count field can hold. For example, if sixteen bits are used for the count field, then the maximum count is 65535. If it is larger, then the logic moves to block 116 to divide the count field of every entry in the table by two.

Proceeding to decision diamond 118 from block 116 or from decision diamond 114 if the test there was negative, the drive controller 18 determines whether the new count is now larger than the count of the entry as pointed to by the backward pointer associated with the current band, i.e. the next higher entry in the ordered link list. If it is now larger, the logic moves to block 120 where the position of these two entries in the link list are swapped. It then loops back to decision diamond 118 and repeats until the link list is properly ordered.

Figure 8:
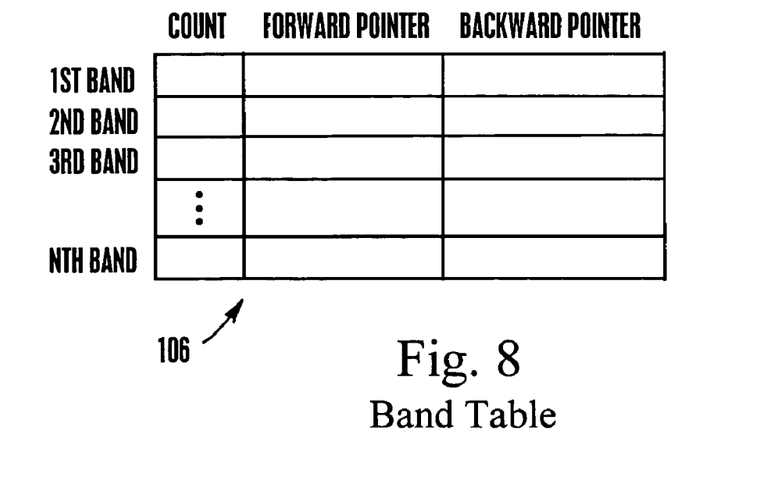
FIG. 8 shows a preferred data band table.
Figure 10:
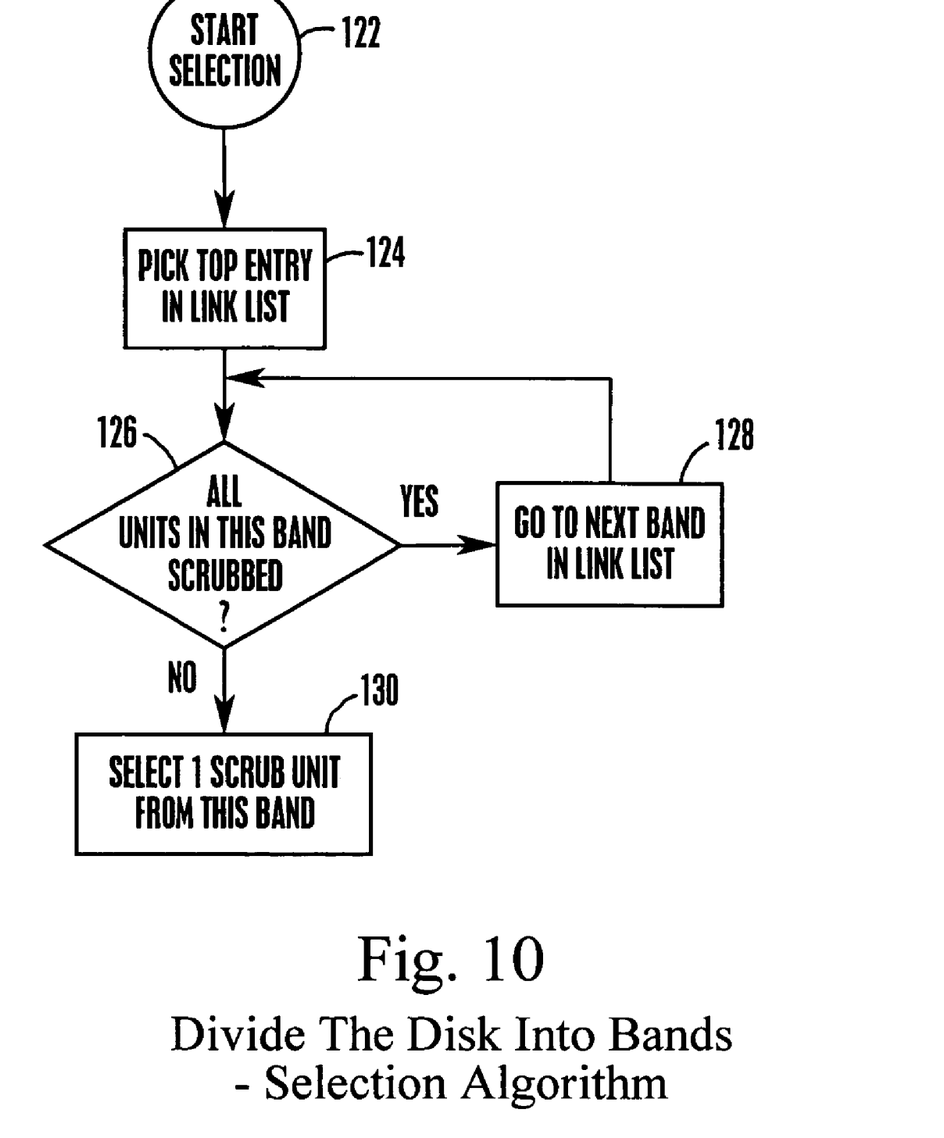
FIG. 10 is a flow chart showing the preferred process for selecting a unit to scrub.

Lastly, FIG. 10 shows the selection algorithm which is entered at state 122 for the above-described table implementation of FIGS. 8 and 9. In block 124, the top entry in the link list (the entry with the highest count) is selected. Moving to decision diamond 126 it is determined whether all the scrub units in this band have already been scrubbed. If all units are already scrubbed, the logic moves to block 128 where the next band in the link list is selected and then returns to diamond 126. If a band is found at decision diamond 126 in which not all data units have been scrubbed, then block 130 is entered to select a scrub unit from this band.

For errors that are recoverable using error recovery procedures (ERP), the drive controller 18 can attempt to write the data back to the original location and then read the data to determine if it again contains errors. If it does, it indicates that the physical location is damaged. This option can be controlled with a new mode page parameter. If a user has specified auto-reassign in its mode page, the controller 18 writes the recovered data to the new location. When auto-reassign is not specified but rewriting to the original location also is not specified, the recovered data can be saved in a protected region that can be checked in the event of subsequent unrecoverable errors to see if the lost data resides in the protected region.

While the particular SYSTEM AND METHOD FOR AUTONOMOUS DATA SCRUBBING IN A HARD DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A hard disk drive, comprising:
   at least one storage disk;
   at least one drive controller reading data from and writing data to the disk, the drive controller executing logic comprising:
   executing a scrub cycle including:
      reading at least one data unit;
      determining whether an error exists in the data unit, and if so, undertaking at least one of: recording the error, or reporting the error;
      executing the reading and determining logic for subsequent data units;
   if a user request for at least one of: a data read, or a data write, is received, interrupting the scrub cycle to fulfill the request, and then waiting a delay period after fulfilling all user requests in a user request queue prior to resuming the scrub cycle, wherein the delay period is an adaptive delay period that depends on at least one of: a frequency, or a number, of user requests received by the drive controller.

2. The disk drive of claim 1, in combination with a RAID system, wherein the user request is received by the drive controller from a RAID controller.

3. The disk drive of claim 1, wherein the disk drive is partitioned into data bands, the drive controller maintaining a table indicating at least recent accesses to bands.

4. The disk drive of claim 1, comprising executing the scrub cycle on data immediately adjacent on the disk to data that is subject to a user request, as part of fulfilling the request.

5. The disk drive of claim 1, comprising executing the scrub cycle on first data that has been written more recently than second data, and then scrubbing the second data.

6. The disk drive of claim 1, comprising executing the scrub cycle on areas of the disk that have been more frequently accessed than other, less frequently used areas, and then scrubbing the less frequently used areas.

7. A hard disk drive, comprising:
   at least one storage disk;
   at least one drive controller reading data from and writing data to the disk, the drive controller executing logic comprising:
   executing a scrub cycle including:
      reading at least one data unit;
      determining whether an error exists in the data unit, and if so, undertaking at least one of: recording the error, or reporting the error;
      executing the reading and determining logic for subsequent data units;
   if a user request for at least one: a data read, or a data write, is received, and if a current scrub rate exceeds a threshold rate, interrupting the scrub cycle to fulfill the request, and then resuming the scrub cycle, and otherwise not interrupting at least an existing scrub read of the scrub cycle.

8. The disk drive of claim 7, in combination with a RAID system, wherein the user request is received by the drive controller from a RAID controller.

9. The disk drive of claim 8, comprising waiting a delay period after fulfilling all user requests in a user request queue prior to resuming the scrub cycle.

10. The disk drive of claim 9, wherein the delay period is an adaptive delay period that depends on at least one of: a frequency, or a number, of user requests received from the RAID controller.

11. The disk drive of claim 7, wherein the disk drive is partitioned into data bands, the drive controller maintaining a table indicating at least recent accesses to bands.

12. The disk drive of claim 7, comprising executing the scrub cycle on data immediately adjacent on the disk to data that is subject to a user request as part of fulfilling the request.

13. The disk drive of claim 7, comprising executing the scrub cycle on first data that has been written more recently than second data, and then scrubbing the second data.

14. The disk drive of claim 7, comprising executing the scrub cycle on areas of the disk that have been more frequently accessed than other, less frequently used areas, and then scrubbing the less frequently used areas.

15. A hard disk drive, comprising:
at least one storage disk;
at least one drive controller reading data from and writing data to the disk, the drive controller executing logic comprising:
executing a scrub cycle including:
reading at least one data unit;
determining whether an error exists in the data unit, and if so, undertaking at least one of: recording the error, or reporting the error;
executing the reading and determining logic for subsequent data units, wherein the scrub cycle is executed on first data char has been written more recently than second data, and then is executed on the second data, wherein if a user request for at least one: a data read, or a data write, is received, and if a current scrub rate exceeds a threshold rate, interrupting the scrub cycle to fulfill the request, and then resuming the scrub cycle, and otherwise not interrupting at least an existing scrub read of the scrub cycle.

16. The hard disk drive of claim 15, wherein if a user request for at least one of: a data read, or a data write, is received, interrupting the scrub cycle to fulfill the request, and then resuming the scrub cycle.

17. The disk drive of claim 16, in combination with a RAID system, wherein the user request is received by the drive controller from a RAID controller.

18. A hard disk drive, comprising:
at least one storage disk;
at least one drive controller reading data from arid writing data to the disk, the drive controller executing logic comprising:
executing a scrub cycle including:
receiving a user data request;
expanding the request to include one or more adjacent data scrub units;
scrubbing the data scrub unit while servicing the request; and
determining whether an error exists in the data scrub unit, and if so, undertaking at least one of: recording the error, or reporting the error, wherein if a user request for at least one of: a data read, or a data write, is received, and if a current scrub rate exceeds a threshold rate, interrupting the scrub cycle to fulfill the request, and then resuming the scrub cycle, and otherwise not interrupting at least an existing scrub read of the scrub cycle.

19. The hard disk drive of claim 18, wherein if a user request for at least one of: a data read, or a data write, is received, interrupting the scrub cycle to fulfill the request, and then resuming the scrub cycle.

20. The disk drive of claim 19, in combination with a RAID system, wherein the user request is received by the drive controller from a RAID controller.

21. A hard disk drive, comprising:
at least one storage disk;
at least one drive controller reading data from and writing data to the disk, the drive controller executing logic comprising:
executing a scrub cycle including:
reading at least one data unit;
determining whether an error exists in the data unit, and if so, undertaking at least one of: recording the error, or reporting the error;
executing the reading and determining logic for subsequent data units, wherein the scrub cycle is executed on areas of the disk that have been more frequently accessed than other, less frequently used areas, and then is executed on the less frequently used areas, wherein if a user request for at least one: a data read, and a data write, is received, and if a current scrub rate exceeds a threshold rate, interrupting the scrub cycle to fulfill the request, and then resuming the scrub cycle, and otherwise not interrupting at least an existing scrub read of the scrub cycle.

22. The hard disk drive of claim 21, wherein if a user request for at least one of: a data read, or a data write, is received, interrupting the scrub cycle to fulfill the request, and then resuming the scrub cycle.

23. The disk drive of claim 22, in combination with a RAID system, wherein the user request is received by the drive controller from a RAID controller.

* * * * *